United States Patent [19]

Gianelo

[11] Patent Number: 5,125,710
[45] Date of Patent: Jun. 30, 1992

[54] UNDER-PLATFORM DRAWER FOR TRUCKS

[76] Inventor: Angelo Gianelo, P.O. Box 359, Salt Lake City, Utah 84110

[21] Appl. No.: 699,733

[22] Filed: May 14, 1991

[51] Int. Cl.$^5$ ............................................. B60R 9/00
[52] U.S. Cl. ................................ 296/37.1; 296/37.6; 296/24.1; 414/522
[58] Field of Search .................. 296/37.1, 37.6, 24.1; 414/522

[56] References Cited

U.S. PATENT DOCUMENTS

| | | | |
|---|---|---|---|
| 2,784,027 | 3/1957 | Temp | 296/37.6 |
| 2,788,137 | 4/1947 | Harkness | 296/37.6 |
| 3,240,408 | 3/1966 | Lapansie | 296/37.6 |
| 3,471,070 | 10/1969 | Olson | 293/117 |
| 3,727,971 | 4/1973 | Sisler | 296/37.6 |
| 3,741,604 | 6/1973 | Heath | 296/1.1 |
| 4,103,956 | 8/1978 | Faulstich | 296/24.1 |
| 4,111,481 | 9/1978 | Nix et al. | 296/39.2 |
| 4,159,844 | 7/1978 | Weiner | 296/37.1 |
| 4,394,100 | 7/1983 | Sperlich | 296/183 |
| 4,469,364 | 9/1984 | Rafi-Zadeh | 296/37.6 |
| 4,573,731 | 3/1986 | Knaack et al. | 296/37.6 |
| 4,580,827 | 4/1986 | Feagan | 296/37.6 |
| 4,733,899 | 3/1988 | Williams | 296/24.1 |
| 4,749,226 | 6/1988 | Heft | 296/37.6 |
| 4,770,330 | 9/1988 | Bonstead et al. | 224/42.42 |
| 4,824,158 | 4/1989 | Peters et al. | 296/37.6 |
| 4,830,242 | 5/1989 | Painter | 224/42.42 |
| 4,890,970 | 1/1990 | Willits | 414/462 |
| 4,915,437 | 4/1990 | Cherry | 296/37.6 |
| 4,917,430 | 4/1990 | Lawrence | 296/37.6 |

*Primary Examiner*—Robert R. Song
*Attorney, Agent, or Firm*—Trask, Britt & Rossa

[57] ABSTRACT

An under platform drawer adapted for mounting on a utility vehicle is disclosed. The drawer is adapted to increase the storage capability of the vehicle while not affecting the previously provided storage area. The drawer includes a pair of parallelly mounted guide tracks adapted to be secured orthogonally to the longitudinally extending frame members of the truck's chassis. A pair of parallelly positioned guides are displaceably mounted on the guide tracks. A storage drawer is fixedly mounted to the guides whereby the drawer may be extended outwardly or returned inwardly along an axis orthogonal to the longitudinal axis of the vehicle.

15 Claims, 5 Drawing Sheets

UNDER-PLATFORM DRAWER FOR TRUCKS

BACKGROUND OF THE INVENTION

1. Field

This invention is relates to a storage container adapted for mounting beneath a platform-type truck body. More specifically, the invention is directed to a storage container which is adapted to be accessible from the side of the truck.

2. Statement of the Art

The cargo area in a truck, specifically a utility trucks, is limited. As a result, it becomes important to utilize every available quantity of space for purposes of efficiently storing articles to be transported. The need to efficiently store articles is especially important in utility-type trucks such as those used by contractors, carpenters, construction workers, plumbers, electricians, and similar utility-oriented tradesmen.

The art is replete with various cargo and storage containers which have been adapted into the structure of utility-type vehicles, especially pickup trucks. In the most common construction, a tool box is positioned in the bed of the truck proximate the wall of the cab. While such boxes provide a rather large storage capacity, they do present disadvantages in that they restrict the available storage space of the cargo bed of the truck. Furthermore, such cargo or storage boxes are difficult to access from the side of the vehicle. Oftentimes the user must actually enter the bed of the truck in order to fully access the tools or other materials which are stored in the tool box. A user standing on the side of the truck oftentimes cannot reach fully into the tool box for purposes for accessing articles stored therein. A tool box of this general description is disclosed in U.S. Pat. No. 4,580,827 (Feagan).

Inventive attempts in the art have also been directed to constructing storage-type containers which may be positioned to extend along the length of the bed of the truck. In many instances, a secondary truck bed is constructed over atop these storage container so as to not only provide the user with a full truck bed surface but furthermore to provide a storage area positioned beneath the secondary bed. In U.S. Pat. No. 4,394,100 (Sperlich), a removable cover for a pickup truck cargo box is disclosed. As shown therein, Sperlich illustrates a secondary bed which is positioned above the truck bed so as to define a storage area above the bed as well as defining a storage area between the secondary bed and the original bed of the truck.

Other inventors have utilized a similar design to Feagan but have furthermore positioned one or more storage containers beneath the bed structure. These new storage containers oftentimes are displaceably mounted on the bed of the truck so that they may be displaced outwardly, over the tailgate of the truck, thereby being made accessible to the user. For example, as shown in U.S. Pat. No. 2,784,027 (Tenp), a pickup truck is shown having a secondary construction which is spacedly mounted from the original bed of the truck. A plurality of storage containers, mounted in a unitary frame is mounted displaceably on the bed of the pickup truck cargo compartment.

Other structures which utilize a similar approach are shown in U.S. Pat. No. 4,830,242 (Painter). A somewhat similar device adapted for use in station wagons is also shown in U.S. Pat. No. 2,788,137 (Harkness). Further reference is made to a somewhat similar construction shown in U.S. Pat. No. 4,469,364 (Raifi-Zadeh).

Other attempts at modifying or otherwise increasing the storage area capacity of a utility truck have included the placement of a storage container proximate the rear tailgate of the pickup tuck. While this particular approach somewhat alleviates the problems encountered in placing the storage container proximate the cab wall, the placement of the storage container proximate the rear tailgate of the bed of the pickup truck does not alleviate the reduction in storage carrying capacity of the bed of the truck. An example of this particular construction is shown in U.S. Pat. No. 4,749.226 (Heft).

U.S. Pat. No. 3,727,971 (Sisler) discloses a plurality of storage containers which are mounted contiguous with the sidewalls of the truck storage bed. U.S. Pat. No. 4,733,898 (Williams) discloses a plurality of hinged top receptacles which are inset into the bed of a pickup truck to extend downwardly into the chassis of the truck. An even more exotic approach to increasing storage capacity of a truck is shown in U.S. Pat. No. 3,471,070 (Olson) wherein the bumper of the truck has been formed to define a plurality of receptacles therein adapted for receiving and storing articles. A hinged top is mounted to the bumper to close the receptacle and thereby insulate them from the environment.

While all of the above-referenced disclosures have made attempts at increasing the total storage area which is available on a utility-style truck, there continues to exist a need for alternative storage container constructions which at once increase the storage area capability of a vehicle while at the same time do not result in a diminution of the original storage capability of the vehicle extant prior to the incorporation of the additional storage container structure into the truck.

SUMMARY OF THE INVENTION

A storage container adapted for mounting under a platform-type truck body is disclosed. The storage container includes a pair of parallelly-oriented mounting track members, each having a generally upright "S"-shaped configuration. Each of the mounting tracks defines a first or upper leg which may be positioned horizontally in its installed condition. The first leg is linear in configuration. Each mounting track further includes a second or lower leg which also may be linear in configuration and horizontally positioned in its installed condition. Each of the mounting tracks is fitted with a pair of rotatably mounted wheels or rollers. A first roller is mounted on the first leg preferably proximate its intersection or connection with the second leg. The roller is positioned to extend towards the opposing mounting track. A second wheel or roller is mounted on the free end of the second leg of the mounting track. Each first or upper leg and a respective lower leg are conjoined to one another proximate the ends thereof. A pair of guide tracks is displaceably associated with the pair of mounting tracks. Each guide track includes am upper section which is configured to receive and ride on the first roller and a lower section. In one construction, this upper section may be generally "C"-shaped in configuration, thereby defining an upper laterally extending leg, a lower laterally extending leg and a upright sidewall interposed between the upper and lower legs. Both the upper leg and the lower leg of the upper section are positioned to be generally horizontal in their installed condition. The upper leg presents a planar surface which rides on the first roller along a length thereof.

The lower leg may be positioned sufficiently close to the lower surface of the roller to provide a stabilizing effect for the upper section. The lower section of each of the guide tracks is positioned generally parallel to the upper section and likewise may present a "C"-shaped appearance. In the alternative, the lower section may have an inverted "L"-like appearance. Each of the guide track sections are generally linear in configuration and each upper section is positioned generally parallel to its respective lower guide track section. Furthermore, each of the upper guide track sections are positioned parallel to one another as are the lower guide track sections, positioned parallel to one another. The lower guide tracks may be constructed to define an upper leg and a lower leg. The upper leg may have a planar surface adapted for displacingly riding along the upper surface of the second roller along a length thereof.

A plurality of cross members are mounted to the mounting tracks to extend therebetween and hold the two mounting tracks in a parallel fixed orientation relative to each other. In some constructions, a first cross member is positioned proximate the intersection of an upper and lower mounting track leg. A second cross member may be fixedly mounted to the lower leg of the mounting track proximate the free end thereof to extend between the two lower mounting tracks. A drawer-like container is fixedly mounted to each of the lower guide track sections and extends therebetween. The storage container which may be of a box-like construction having four upright sidewalls and a bottom which is fixedly mounted to each of the free ends of the sidewalls. A bottom may be fixedly mounted to each of the lower ends of the sidewall to form a bottom for the container. In typical constructions, the top of the storage container is left open thereby permitting the user to access the interior of the container upon its displacement outwardly from the frame of the vehicle in which the storage container has been mounted.

DETAILED DESCRIPTION OF THE ILLUSTRATED EMBODIMENT

Figure 1:
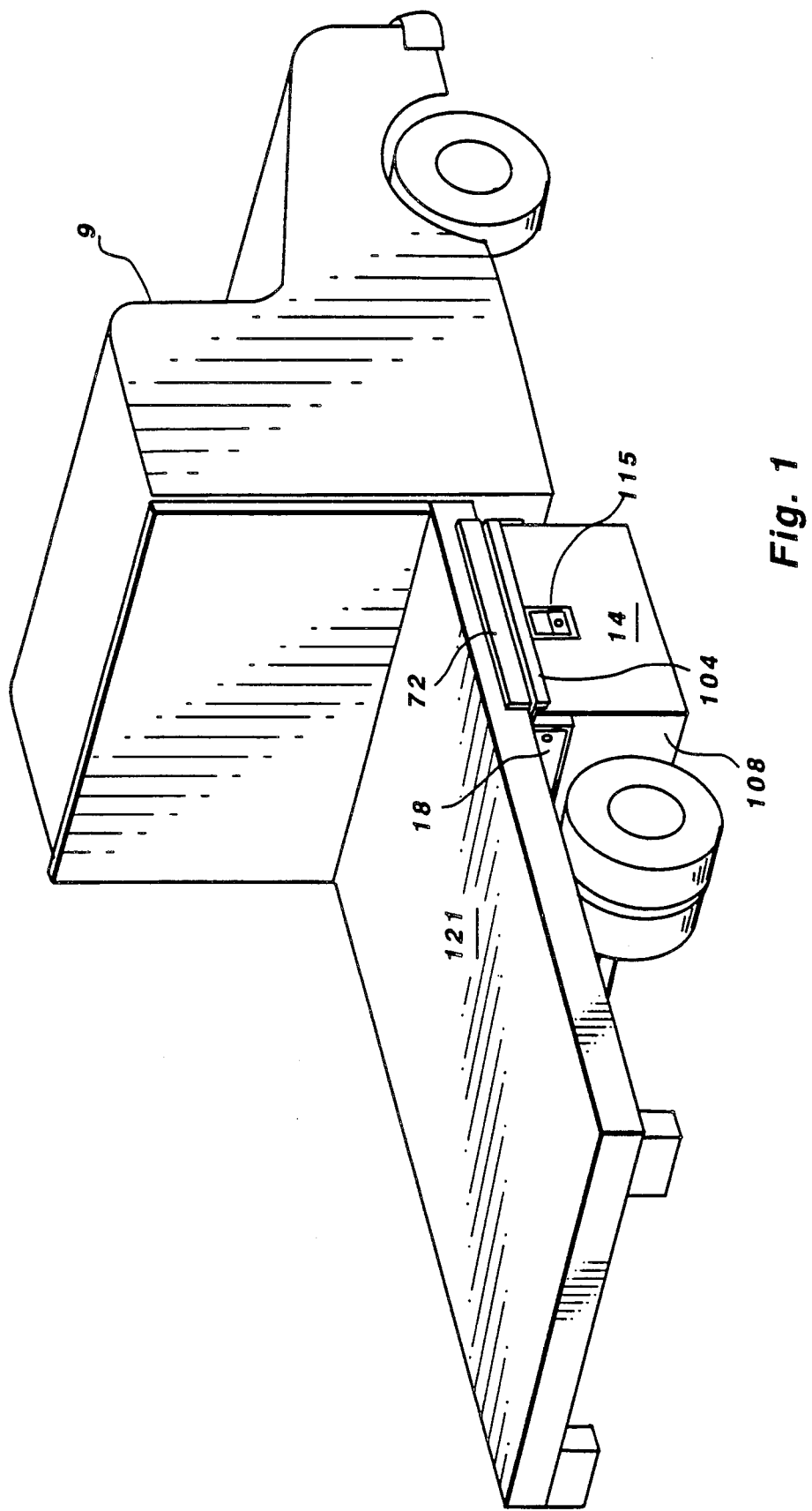
FIG. 1 is a perspective view of a truck fitted with a under-platform drawer storage container of the invention.

As shown in FIG. 1, the under-platform storage container of the instant invention is adapted to be fitted on the underside of a platform truck vehicle whereby it may be pulled laterally outwardly from the side of the vehicle and accessed for purposes of the user retrieving or otherwise storing articles in the container. The storage drawer, and more specifically the mounting tracks of that drawer, are adapted specifically to take advantage of the construction of a conventional platform body. Whereas conventional storage containers traditionally have opted to position their container constructions parallel to the longitudinal frame support members of a utility truck, the instant invention positions its mounting tracks to be generally orthogonal to those longitudinal frame support or sill members. This particular approach results in a storage container which is positionable beneath the platform of the truck yet is adapted to extend laterally from the side of the vehicle as opposed to being extendible from the rear of the vehicle. The drawer is adapted to specifically utilize the span on the underside of the platform between the cab and the rear wheels of the truck.

Figure 2:
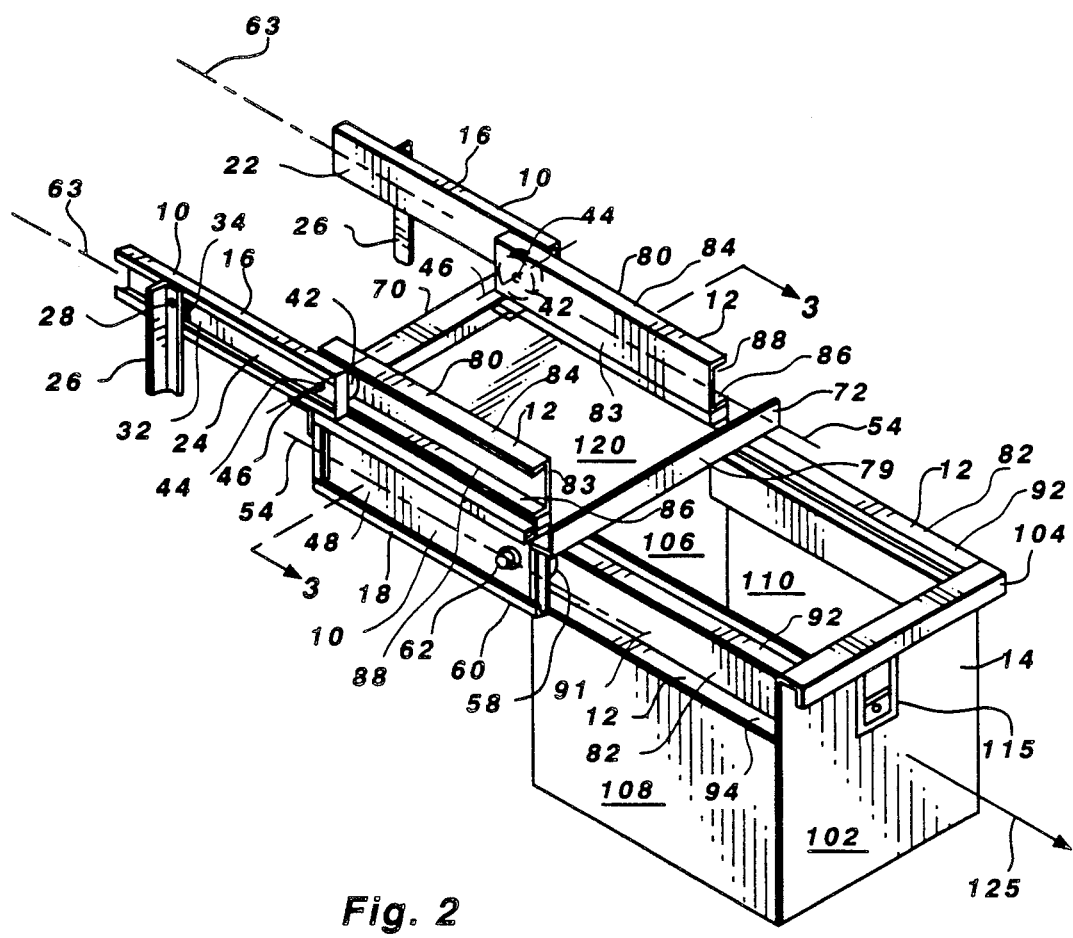
FIG. 2 is an elevated perspective view of a under-platform storage container of the invention illustrating the drawer in its outwardly extended condition.

As shown in FIG. 2, the storage container of the instant invention includes a pair of mounting tracks 10, a pair of guide tracks 12 and a storage container 14. The storage container 14 is fixedly mounted to the guide tracks 12. As shown more specifically in FIGS. 2, 3 and 4, the mounting tracks 10 of the invention are generally linear, elongate-shaped members. Each of the mounting tracks 10 defines two distinctive sections, an upper section 16 and a lower section 18. As shown, each of the upper sections 16 is a generally elongate, linear-shaped member having a generally rectangular configuration and defining a generally planar inner surface 22. Each upper section has a generally "C"-shaped exterior facing surface 24. Each of the upper sections 16 is fitted with a support mounting bracket 26 which is oriented generally orthogonal to the longitudinal axis 63 of the upper section 16. Each bracket 26 is securely mounted to its respective upper section 16 by means of a bolt 28.

Figure 5:
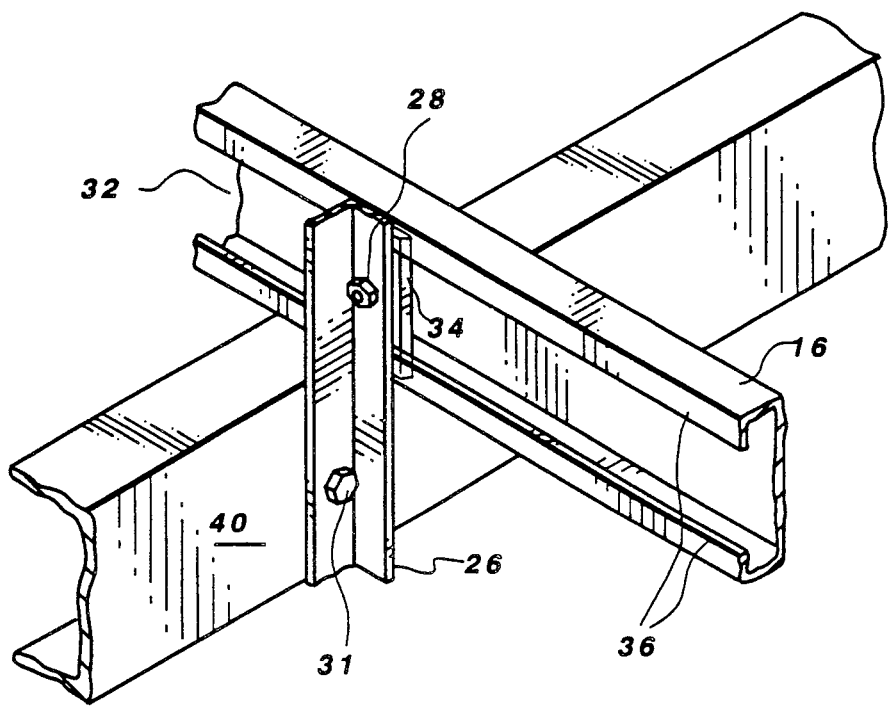
FIG. 5 is a sectional view of the upper mounting track of the drawer shown in its mounted orientation on the frame of the vehicle.

Bracket 26 may be a generally "L"-shaped rigid member which is interconnected with its upper section 16 by means of the bolt 28 passing through an aperture defined in the bracket 26 and subsequently passing through an aperture in an elongate member 34 which is positioned within the channel 32 formed by the exterior surface of upper section 16. Elongate member 34 is adapted to form a reinforcement member for securing the bracket 26 to the upper section 16. As shown in FIG. 5, the opposing ends of the elongate member 34 are positioned in abutment against the vertically extended upper and lower downturned edges 36 of the upper section 16. It follows that as the bolt 28 passes through the elongate member 34 and is secured on the opposing side of the elongate member 34, by a nut (not shown) the elongate member 34, in conjunction with the bolt 28, forms a means of securing the bracket 26 against the upper section 16. The bracket 26 may be secured to a longitudinally extending chassis frame member 40 of the vehicle 9 (FIG. 5) by a nut and bolt arrangement 31.

Figure 6:
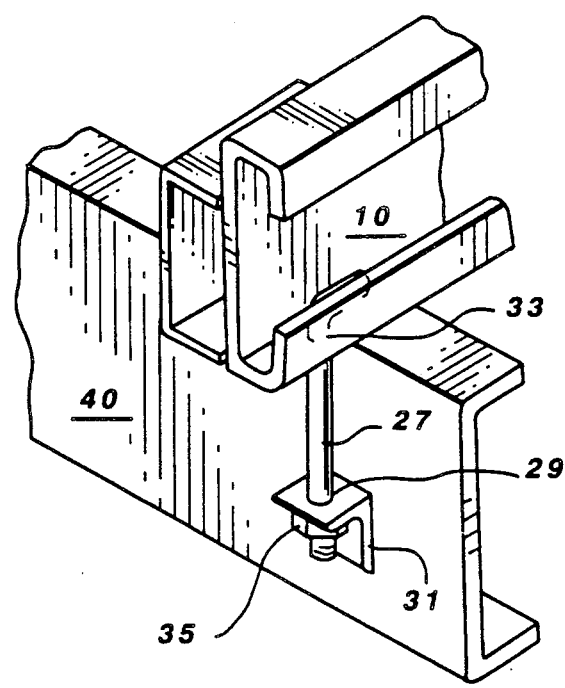
FIG. 6 is a perspective view of a mounting arrangement of the drawer.

FIG. 6 illustrates an alternative structure for mounting the mounting track 10 to the longitudinal sill 40. As shown, a "J"-shaped bolt 27 is removably inserted on a first end through an aperture 29 defined in a mounting bracket 31 which is securedly mounted to the sidewall of longitudinal sill 40. The opposing free end of bolt 27 which is "J" shaped is inserted through an aperture 33 defined in the mounting track 10. The first free end of bolt 27 defines a plurality of male threads thereon. A nut 35 is threaded onto the first free end, thereby securing the mounting guide in place relative to the longitudinal sill 40.

Figure 3:
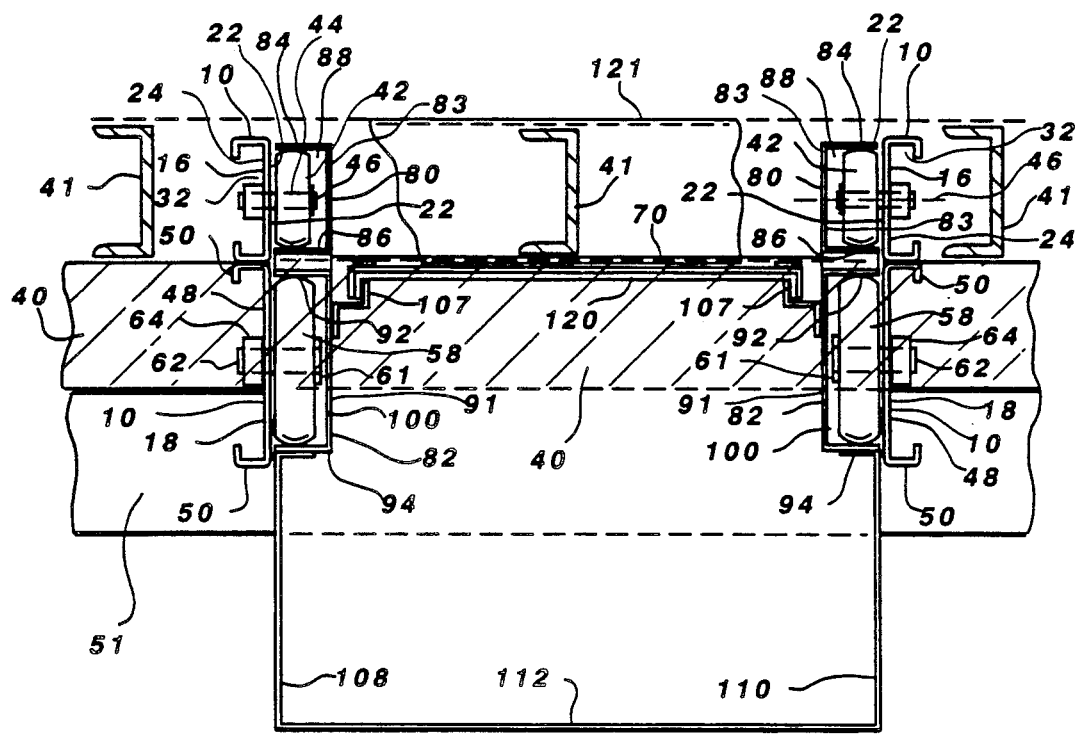
FIG. 3 is a cross-sectional view of the drawer of FIG. 2 taken along section lines 3—3.

As shown in FIG. 3, a first wheel or roller 42 is rotatably mounted on an axle 44 which is secured to the end of the upper section 16 by a shaft collar and kotter pin assembly. The roller 42 which may be generally circular in side view, is adapted to rotate about a generally horizontal rotational axis 46.

The lower section 18 of each mounting track 10 has a similar construction to that of the upper section 16, i.e., it forms a linear, elongate-shaped member having a generally rectangular configuration. Each of the lower sections 18 includes a generally planar sidewall 48 shown in FIG. 3. Each lower section 18 further defines two generally "U"-shaped channels which extend outwardly from the generally planar central region of the section 18. Each of the generally "U"-shaped extensions 50 extend outwardly away from the interior facing planar surface 48. The lower section 18 is fixedly connected to the upper section 16 proximate a first end thereof. As shown specifically in FIG. 2, the longitudinal axis 63 of each upper section 16 is oriented parallel to the longitudinal axis 54 of its respective lower section 18.

In alternative constructions, a vertical riser or spacer may be positioned or interposed between the two sections so as to extend one section spatially from the other. In this alternative construction, the orientation of the respective longitudinal axes 63 and 54 remain constant, i.e., the longitudinal axes are oriented parallel to one another.

Figure 4:
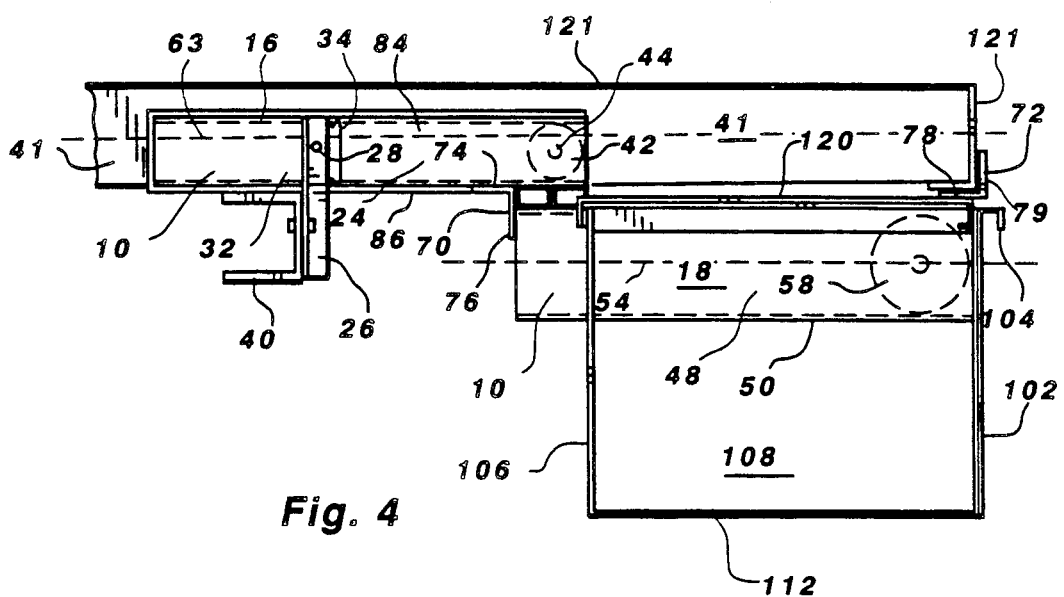
FIG. 4 is an elevational side view of a drawer of the instant invention shown in its closed condition.

As shown in FIG. 4, in their installed position in a truck, the upper section 16 of the mounting track is positioned elevationally above the lower section, 18. It follows that the longitudinal axis 63 is positioned horizontally and elevationally above the horizontally positioned longitudinal axis 54. A second roller 58 is rotatably mounted to each of the respective lower mounting track sections 18 proximate the respective free ends 60 thereof. As shown specifically in FIG. 3, the roller 58 is mounted rotatably to the lower section 18 by means of an axle 62 which extends through an aperture defined in the lower section sidewall 48. A shaft collar 64 mounted to surface of lower section 18 retains the axle 62 in position vis a vis the lower section 18. Axle 62 may be fitted with a kotter pin 61 to hold the roller 58 in place.

As shown to advantage in FIG. 2, the longitudinal axles 63 of the opposing mounting track upper sections 16 are oriented parallel to one another. Furthermore, the longitudinal axes 54 of each of the respective lower sections 18 are likewise oriented parallel to one another.

A pair of cross-members 70 and 72 are mounted to the opposing mounting tracks 10 and function to interconnect the opposing mounting tracks in a fixed orientation relative to each other. As shown in FIGS. 2 and 4, the cross-member 70 is a generally inverted "L"-shaped member having a horizontally positioned upper leg 74 which is secured to the bottom surface of each of the respective upper sections 16. The cross-member 70 likewise includes a vertically positioned second leg 76 which is oriented orthogonally to the upper leg 74. The lower leg 76 is mounted in securement against the end of the lower leg 18 of the mounting track 10 as shown to advantage in FIG. 4.

The second cross-member 72 has a reversed "L"-shaped configuration and is mounted on its lower leg 78 to the lower section 18 of the mounting track 10. The vertically extending leg 79 of cross-member 72 is securedly mounted preferably along its length on the upright edge of the truck platform 121 as shown by FIG. 4. The drawer is thus fixedly secured to the truck at three distinct locations. As shown in FIG. 2, each of the cross-members 70 and 72 is dimensioned to be substantially equal in length. The cross-members retain the parallel relationships of the respective longitudinal axes of the upper and lower sections of the mounting track 10.

Each of the guide tracks 12 of the storage drawer construction may be viewed as being individually constructed of two definite sections, a upper section 80 and a lower section 82. As shown to advantage in FIGS. 2 and 3, the upper section 80 may be a generally "C"-shaped member having a planar, vertically extending sidewall 83 and an orthogonally extending planar leg 84, mounted on the upper edge of the sidewall 83. A parallelly extending lower leg 86 is mounted on the lower edge of the upright sidewall 82. As shown to advantage in FIG. 3, the extensions 84 and 86 are oriented parallel to one another. Each of the extensions 84 and 86 has a generally planar construction. The upper sections 80 each define a channel 88 which is adapted and dimensioned to receive a respective first roller 42. As shown in FIG. 3, the height of the channel 88 is specifically dimensioned such that the roller 42 is received therein. The lower surface of the top extension 84 of upper section 80 rides atop the top of the roller 42 while the bottom surface of the roller 42 is preferably dimensioned to provide a small spatial separation between itself and the upper surface of the lower extension 86 of upper section 80. Upper section 80 of the guide track 12 is displaceable along the upper section 16 of the mounting track 10 by means of the lower surface of extension 84 being displaced over the surface of the rotatable roller 42. The lower surface 86 thereby provides some degree of stability to the drawer construction, by restricting the movement of the drawer relative to the mounting tracks.

The lower section 82 of each of the guide tracks 12 may likewise be configured as a generally "C"-shaped member having a planar upright sidewall 91 having a upper orthogonally oriented extension 92 which likewise is planar in construction. A lower planar extension 94 is mounted on the lower edge of the upright sidewall 90. The lower planar extension 94 parallel to the upper extension 92. As clearly seen in FIG. 3, both extension 92 and 94 are oriented orthogonally to the plane of the sidewall 91. Each lower section 82 of the guide track 12 defines a channel 100 therein which is dimensioned to receive the lower roller 58. As shown to advantage in FIG. 3, the lower surface of the upper extension 92 rides atop wheel 58. The height of the channel 100 is dimension so as to provide a small spatial separation of the lower surface of the roller 58 and the upper surface of the lower extension 94. Thusly, the wheel 58 may freely rotate without encumbrance from the upper surface of the lower extension 94. Lower guide section 82 is displaceable along the lower track section 18 by means of the lower surface of extension 92 being displaced over the surface of the rotatable roller 58.

The storage container 14 of the invention may include a planar front wall 102 which has a generally quadrilateral configuration. A generally "L"-shaped lip 104 is mounted on the upper edge of front wall 102. A backwall of the storage container 14 likewise is a planar panel 106 having a quadrilateral configuration which may be generally rectangular. The front wall 102 and the back wall 106 respectively are positioned so that the planes thereof are oriented parallel yet spacedly from each other. A pair of connecting sidewalls 108 and 110 are mounted to each of the back wall and front wall 102 and 106 along a respective upright vertical edge thereof to form a generally box-like configuration wherein the planes of the sidewalls and 110 are oriented parallel to one another while be oriented perpendicular to the planes of the front wall 102 and back wall 106. A planar bottom 112 is mounted to each of the bottom edges of the panels 102 and 106 and 108 and 110 to form a box-like configuration adapted to receive and retain articles placed therein.

A latch 115 may be secured on the front wall 102 of the storage container 14. The latch 115 may be adapted to engage panel 120 which is attached to the cross-member 72 to form a means of locking or otherwise retaining the storage container in place in a closed position. Furthermore, the latch 115 may be fitted with a lock whereby the user may secure the storage container 14 in a locked and secure condition.

A planar panel 120 is shown in a generally horizontal orientation mounted to each of the respective cross-members 70 and 72 to extend therebetween. Furthermore, the panel 120 is also secured to the opposing lower sections 18 of the mounting track 10. Panel 120 forms a lid for the storage container 14 upon that storage container being secured in a closed position as shown in FIG. 4.

As shown in FIGS. 2, and 3, each lower section 82 of guide track 12 may each be fitted with an elongate bracket 107 which extends upwardly from its respective lower section 82 to engage the panel 120 and thereby form somewhat of a seal between the drawer 14 and the lid formed by panel 120.

Figure 7:
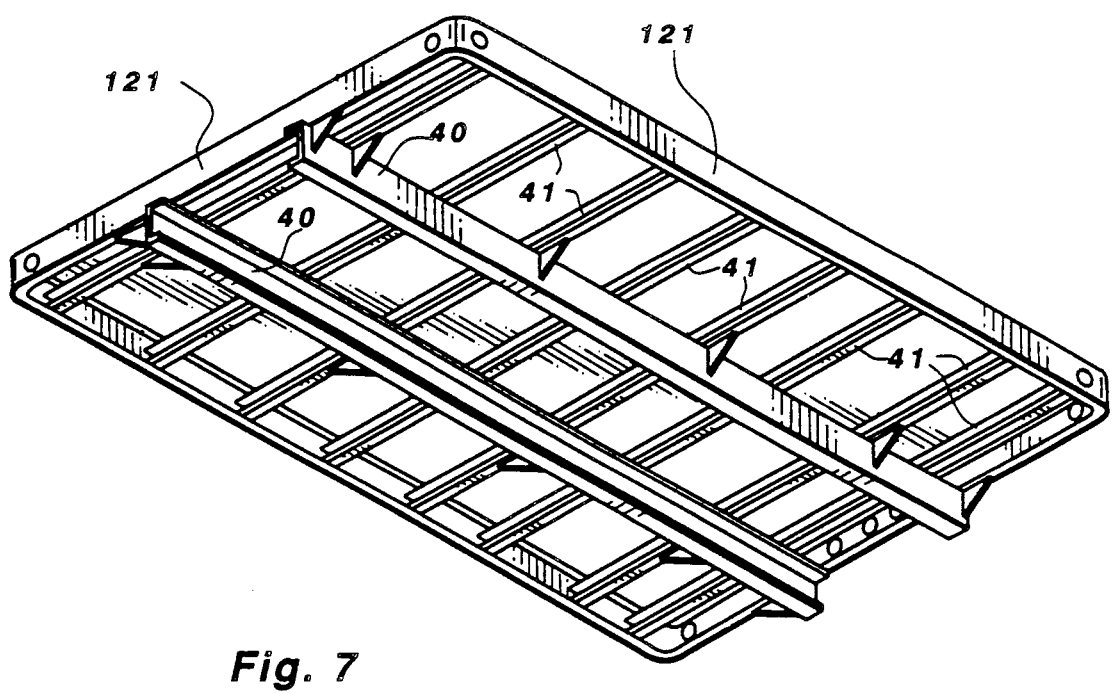
FIG. 7 is a bottom perspective view of a platform of the platform-type truck.

The instant invention is in many ways unique in that it is adapted to be positioned beneath the platform body and yet atop the longitudinally extending frame or sill members of the platform body, which are above and parallel to the truck frame. FIG. 7 illustrates a partial sectional view of the platform of a platform truck. As shown, the platform 121 is supported by a pair of parallelly oriented, spacedly positioned longitudinally extending frame or sill members 40. Positioned atop the longitudinal members 40 is a plurality of spacedly positioned, parallelly oriented cross-members 41. As shown, the cross-members are oriented substantially orthogonally to the longitudinal members 40. The platform 121 is then positioned atop the cross-members 41. The mounting tracks 10 of the invention are configured to be positioned atop the longitudinal frame members 40, generally orthogonal to the longitudinal axis 43 of the frame members 40. The mounting members 10 are mounted parallel to the cross-members 41 in the orientation shown in FIG. 3.

The longitudinal frame or sill 40 members are positioned atop the truck frame 51. (See FIG. 3.) As shown in FIGS. 3 and 4, the upper section 16 of the mounting tracks 10 are positioned atop the longitudinally extending frame members 40 of the truck 9, while simultaneously being positioned between the cross-members of the truck 9. Whereas the longitudinally extending frame members 40 have in the past constrained designers into positioning the mounting tracks of a storage container to be parallel to the longitudinal axes of the longitudinal members, the instant invention places its mounting tracks such that their longitudinal axes are perpendicular to the longitudinal axis of the frame members, the instant invention uses an offset track to go above the frame members 40 to allow full extension.

As shown in FIGS. 2 and 4, the drawer storage container 14 may be displaced between two conditions, an open condition as shown in FIG. 2 and a closed condition as shown in FIGS. 1 and 4. The user simply grasps the handle 104 and pulls the drawer outward in the direction shown by arrow 125 (see FIG. 2). As a result of the force application to the latch handle, the drawer is pulled outwardly as the guide tracks 12 roll atop rollers 42 and 58. The guides 12 may be fitted with a stop member adapted to secure the drawer from being pulled outwardly away from the fixedly mounted mounting tracks 10. Alternatively, the guide tracks 12 may be free of any such stops, thereby permitting the user to remove the storage drawer, together with its fixedly mounted guide tracks 12, from the mounting tracks 10 which are fixedly mounted to the frame of the vehicle.

The instant invention provides a construction which readily uses the available space beneath the frame of the vehicle between the passenger compartment of the vehicle and the rear wheels.

The above description is not intended to limit the scope or protection which alone is provided and described in the claims which are appended hereto.

What is claimed:

1. A storage container adapted for mounting under a platform of a truck, said storage container comprising:

two mounting tracks arranged parallel to and spacedly from one another, each said mounting track having a first mounting section configured to be securely positioned atop a longitudinal chassis frame member of said truck and below said truck's platform, each said mounting track having a longitudinal axis positionable orthogonal to a longitudinal axis of said longitudinal chassis frame member, each said mounting track having a second mounting section, mounted on a respective said first mounting section, oriented parallel to said first mounting section and positioned elevationally lower than said first mounting section;

two first rollers, each said first roller being rotatably mounted on a respective said first mounting section;

two second rollers, each said second roller being rotatably mounted on a free end of a respective said second mounting section, said second rollers being positioned elevationally lower than said first rollers;

two guide tracks, each said guide track having a first guide section and a second guide section, each said first guide section being positioned on a respective said first roller wherein said first guide section is displaceable along a respective said first section of a respective said mounting track, each said second guide section being positioned on a respective said second roller wherein said second guide section is displaceable along a respective said second section of a respective said mounting track; and a container fixedly mounted to said two guide tracks to extend therebetween.

2. The storage container according to claim 1, wherein a cover plate is fixedly mounted to said mounting tracks to extend therebetween, said cover plate forming a cover for said container.

3. The storage container according to claim 1, wherein each said guide track comprises a linearly elongate first guide and a linearly elongate second guide, said second guide being mounted on said first guide, said first guide being positioned parallel to said second guide. said first guide being positioned elevationally above said second guide.

4. The storage container according to claim 1, wherein said first rollers are mounted on said first section proximate a connection of said first section with said second section.

5. The storage container according to claim 2, wherein said first guide is "C"-shaped in configuration.

6. The storage container according to claim 2, wherein said second guide is "C"-shaped in configuration.

7. The storage container according to claim 5, wherein each said first roller is rotatably positioned within a channel defined within a respective said first guide.

8. The storage container according to claim 6, wherein each said second roller is rotatably positioned within a channel defined within a respective said second guide.

9. The storage container according to claim 1, wherein at least one cross-member is mounted to said mounting tracks on their respective ends to retain said mounting tracks positioned parallel to one another.

10. The storage container according to claim 9, wherein said cross-member is mounted to said mounting tracks proximate a connection of said first section with said second section.

11. The storage container according to claim 10, wherein said cross-member is positioned to contact said container to form a stop therefor.

12. The storage container according to claim 1, wherein each first section comprises an elongate linear member having a longitudinal axis.

13. The storage container according to claim 1, wherein each said second section comprises an elongate linear member having a longitudinal axis.

14. The storage container according to claim 12, wherein each said second section comprises an elongate linear member having a longitudinal axis.

15. The storage container according to claim 14, wherein said longitudinal axis of said first section is oriented parallel to said longitudinal axis of said second section.

* * * * *